Feb. 15, 1955 W. K. ERGEN 2,702,367

ELECTRONIC COUNTER

Filed Dec. 30, 1947

Inventor

WILLIAM K. ERGEN

By Morris H. Rabin

Attorney

United States Patent Office 2,702,367
Patented Feb. 15, 1955

2,702,367

ELECTRONIC COUNTER

William K. Ergen, Oak Ridge, Tenn., assignor to Radio Corporation of America, a corporation of Delaware Application December 30, 1947, Serial No. 794,737
3 Claims. (Cl. 324—68)

Figure 1:
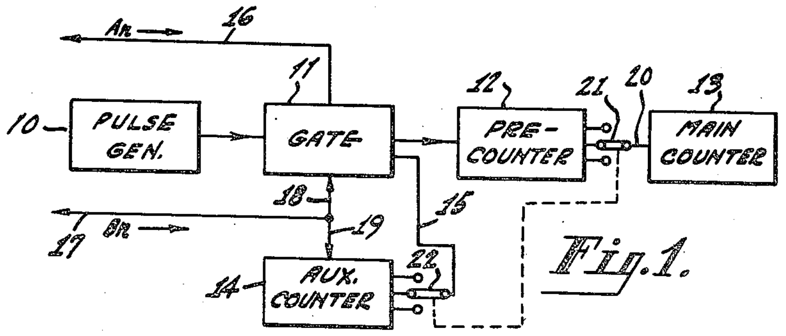

This invention relates to electronic counters such as include a plurality of trigger circuits connected in cascade with one another, and has for its principal object the provision of an improved counting apparatus and method of operation whereby the average length of different and successive time intervals may be readily determined, each time interval being the interval between two (a pair of) pulses.

Such pairs of pulses may be derived from various sources. For example, a pair may be the transmitted and reflected pulse of a radar equipment which has for its purpose to provide information relative to the location of a moving object with respect to a base station or the like.

What the invention accomplishes is to give information as to the average length of a predetermined number of time intervals, each time interval being the interval between two pulses.

Such average time interval is derived by a counting apparatus which includes a gate connected between a constant frequency generator and a pre-counter having its output connected to the input of a main counter on which data relative to the average time interval between the pulses is observed. This gate is opened in response to the first pulse of the first pair and is closed by an auxiliary counter in response to the last pulse of the last pair. This completes the operating cycle of the apparatus. Subsequent operating cycles are initiated by resetting the apparatus to its standby condition.

Important objects of the invention are the provision of an improved counting apparatus which measures the average length of time intervals, each time interval being the interval between a pair of pulses, irrespective of the times at which such pairs of pulses occur, and the provision of an improved counting apparatus which automatically terminates its cycle of operation in response to the last pulse of the last pair of a pre-determined number of such pairs.

The invention will be better understood from the following description considered in connection with the accompanying drawings and its scope is indicated by the appended claims.

Figure 2:
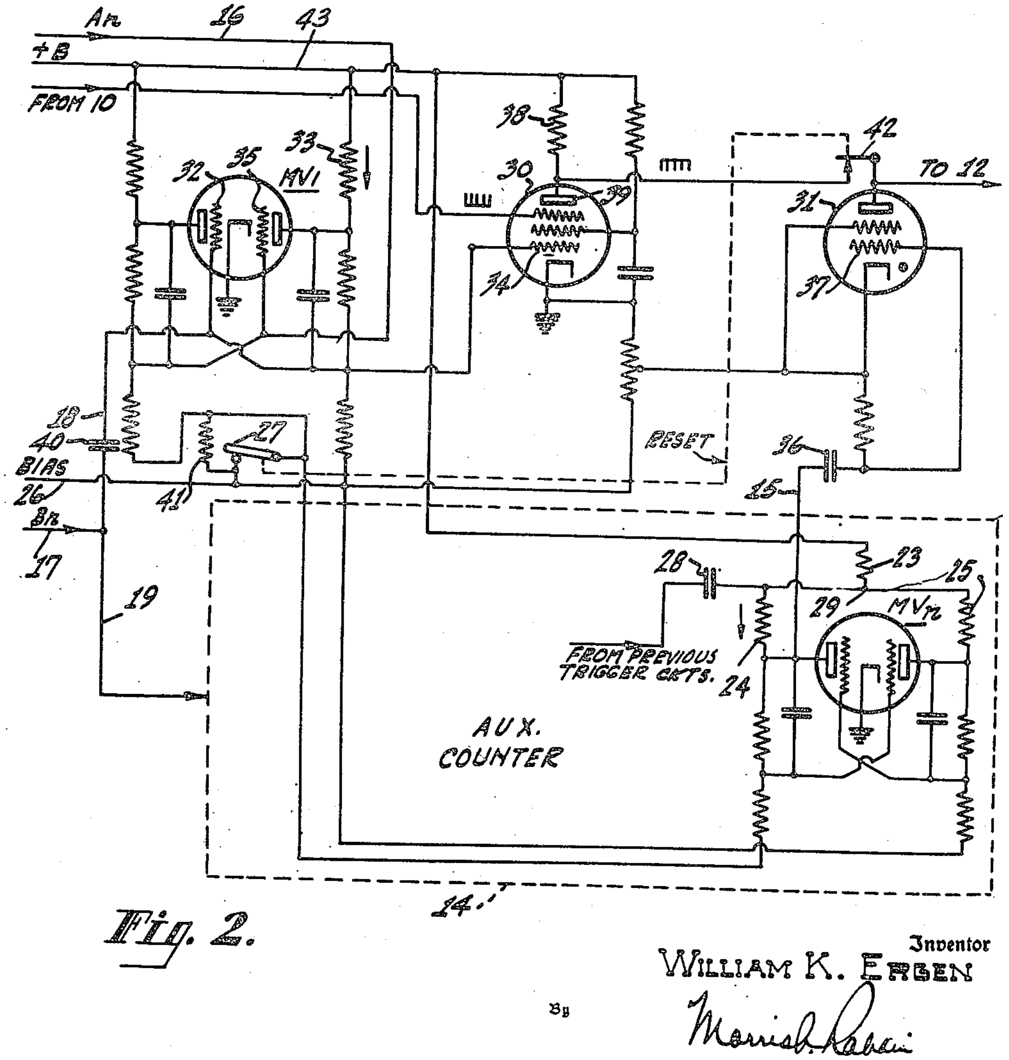

Referring to the drawings:

Fig. 1 is a schematic diagram wherein various parts of the counting apparatus are depicted in the form of boxes bearing explanatory legends, and Fig. 2 is a wiring diagram of such parts of the apparatus as are not well known to those skilled in the art.

The apparatus of Fig. 1 includes a constant frequency pulse generator 10 which is connected through a gate 11 to a pre-counter 12. The pre-counter 12 delivers its output to a main counter 13. An auxiliary counter 14 has its output connected to the gate 11 through a lead 15.

Through a lead 16, the first pulse $A_n$ of a pair of pulses is applied to the gate 11. Through leads 17 and 18, the second pulse $B_n$ of this pair is applied to the gate 11. This second pulse $B_n$ is also applied to the input of the auxiliary counter 14 through a lead 19. The pre-counter 12 and the auxiliary counter 14 are made to have the same number of stages or trigger circuits so that each completes its operating cycle in response to the same number of pulses applied to its input.

With these connections, the gate 11 is opened by the first pulse $A_n$ of the pair and constant frequency pulses are applied to the input of the pre-counter 12. Upon application of the second pulse $B_n$ of the pair, the gate 11 is closed and one count is registered by the auxiliary counter 14. This process is repeated a number of times dependent on the number of stages of the counters 12 and 14. When the operating cycle of the counter 14 has been completed, the gate 11 is closed and remains closed until the apparatus is reset to its standby condition.

As previously indicated, the pre-counter 12 and the auxiliary counter 14 have the same number of stages so that they complete their cycles of operation in response to the application of the same number of pulses to their input stages. The input pulses of the pre-counter 12 have the same constant frequency as that of the generator 10. The input pulses of the auxiliary counter 14 have a frequency determined by the repetition rate of the pulse pairs $A_n$—$B_n$.

Every time the pre-counter 12 completes its cycle of operation, it generates an output pulse which is applied to the main counter 13. During a time interval between a pulse $A_n$ and a pulse $B_n$, counter 13 registers the number of pulses at the input of 12, divided by the division ratio of counter 12, that is the number N of pulses required to drive 12 through one of its cycles of operation. Since N time intervals of the above kind pass, before gate 11 is closed by counter 14, counter 13 registers the average number of pulses delivered by 10 during each such time interval. This number is indicative of the average length of the time interval. The number of time intervals so averaged obviously may be made to have any desired value by adjusting the number of operative stages in the counters 12 and 14. Such adjustment requires nothing more than a relatively simple switch 21—22 arranged simultaneously to cut out one or more of the later stages of the counters 12 and 14.

The counters 12, 13 and 14 may be of the conventional type including a plurality of stages or trigger circuits (such as the trigger $MV_1$ or $MV_n$ of Fig. 2) connected in cascade with one another.

As is well known, a trigger circuit, such as $MV_n$, includes two electron discharge elements which (1) have operating potential applied to their anodes from the +B lead 43 through a common resistor 23 and separate resistors 24 and 25, (2) have their anodes each connected to the grid of the other through a resistor shunted by a capacitor, (3) have bias potential applied to their grids from a lead 26 either directly or through a reset switch 27 and (4) have their cathodes grounded.

Under these conditions, current conduction is stable in either one or the other of the anodes and is shifted from one to the other in response to the application of a negative pulse through a capacitor 28 to the junction point 29 between the common resistor 23 and the separate resistors 24 and 25.

In the case of $MV_n$, which is the last stage of the counter 14, such negative pulse is derived through capacitor 28 from the right hand anode of a previous stage as indicated by a legend. This previous stage receives a negative pulse in an analogous manner from the stage preceding it, and so on, until the first stage of 14 is supplied directly with the pulses $B_n$ through leads 17 and 19. It may be noted that each stage generates a negative pulse at its output, when, and only when, its right hand anode goes from the non-conducting to the conducting state. The opposite transition generates a positive pulse which is ineffective in triggering the next stage. Thus, only every second pulse at the input of each stage is effective in triggering the next stage and, a counter of *n* stages is driven through its cycle by $2^n$ pulses.

The trigger circuit $MV_1$ is similar to $MV_n$ in most respects but differs therefrom in that (1) it has no common anode resistor and (2) current conduction is shifted from one of its anodes to the other by applying a negative pulse through capacitor 40 to the grid of an electron discharge element which is conducting.

What has been said about the counter 14 also applies to the counters 12 and 13, except for the possible modification of counter 13 for decimal rather than binary indication.

Since the constant frequency of the generator 10 is divided by the counter 12, the main counter 13 operates at a relatively low speed. Thus assuming that the generator 10 operates at 10 megacycles (which would allow measurement of the distance between a radar transmitter and a reflecting object in steps of 50 feet) and that the division ratio of the counter 12 is 1/16, then the main counter 13 runs at only about 0.6 megacycle, and decimal indication at this relatively low speed is quite easily possible.

The main counter 13 therefore may be of the type disclosed in Grosdoff application Ser. No. 523,968, filed February 26, 1944, and allowed April 2, 1947 (Patent No. 2,436,963). Also it may be of any other suitable type wherein the electrodes of the electron discharge elements of the different stages are so interconnected through resistors etc. to provide an indication of the number of input pulses in the decimal numerical system, or it may be of the mechanical type if the input frequency is made sufficiently low.

The gate 11 of Fig. 1 includes the trigger circuit $MV_1$, the pentode 30 and the gaseous conduction tetrode 31 of Fig. 2. Assuming that the pulses $A_n$ and $B_n$ are of negative polarity, its operation is readily understood.

Thus, the first pulse $A_1$ is applied to the grid 35 of the unit $MV_1$ transferring current conduction to its left-hand anode. As a result, the current of the anode resistor 33 is interrupted, a more positive potential is applied to the grid 34 of the pentode 30, and constant frequency pulses supplied from the generator 10 pass through tube 30 and are counted by the pre-counter 12. Each time the counter 12 completes its cycle of operation, one pulse is counted by the main counter 13 (see Fig. 1).

The first pulse $B_1$ is applied through the lead 18 to the left hand grid 32 of the unit $MV_1$ transferring current to the right hand anode of the unit $MV_1$ applying a more negative potential to the grid 34 and interrupting the supply of constant frequency oscillations to the counter 12.

This process is repeated for a number of times dependent on the number of stages of the counter 14.

When the number of pulses $B_n$ is sufficient to complete the operating cycle of the counter 14, current conduction is transferred from the resistor 24 to the resistor 25 of the unit $MV_n$, a positive pulse is applied through the capacitor 36 to the grid 37 of the gaseous conduction tetrode 31, this tetrode draws current through the anode resistor 38 of the pentode 30, and the potential of its anode 39 is reduced to a value such that the supply of constant frequency oscillations through to the counter 12 is interrupted. This condition continues until the various parts of the apparatus are reset to a standby condition by opening and closing the reset switch 27. This applies a positive pulse corresponding to the voltage drop in resistor 41, to the appropriate grids of $MV_1$ and the multivibrators of counters 14, 12 and 13. Simultaneously, switch 42 instantaneously interrupts the plate voltage supply of the tetrode 31 in order to extinguish the gaseous conduction.

In the manner previously explained, each operating cycle of the apparatus thus leaves the counter 13 in a state indicating the average number of constant frequency cycles per pair of a predetermined number of $A_n$—$B_n$ pulses.

What the invention provides is a counting apparatus which functions to provide an indication of the average length of time intervals each interval being the interval between two pulses.

I claim as my invention:

1. In a device for measuring the average length of a plurality of time intervals each beginning with a start pulse and ending with a stop pulse, the combination of a first counter, means including a gate responsive (1) to said start pulses for starting a supply of constant frequency pulses to said first counter and (2) to said stop pulses for stopping said supply of constant frequency pulses, a second counter (1) having an operating cycle identical with that of said first counter and (2) connected to count said stop pulses, and means connected between said second counter and said gate for closing said gate in response to completion of the operation of said second counter.

2. In a device for measuring the average length of a plurality of time intervals each beginning with a start pulse and ending with a stop pulse, the combination of a first counter, means including a gate responsive (1) to said start pulses for starting a supply of constant frequency pulses to said first counter and (2) to said stop pulses for stopping said supply of constant frequency pulses, a second counter (1) having an operating cycle identical with that of said first counter and (2) connected to count said stop pulses, means connected between said second counter and said gate for closing said gate in response to completion of the operation of said second counter, and a third counter connected to the output of said first counter for indicating the completed operating cycles of said first counter.

3. In a device for measuring the average length of a plurality of time intervals each beginning with a start pulse and ending with a stop pulse, the combination of a first counter, means including a gate responsive (1) to said start pulses for starting a supply of constant frequency pulses to said first counter and (2) to said stop pulses for stopping said supply of constant frequency pulses, a second counter (1) having an operating cycle identical with that of said first counter and (2) connected to count said stop pulses, means connected between said second counter and said gate for closing said gate in response to completion of the operation of said second counter, and means for simultaneously changing the frequency division ratios of said first and second counters.

References Cited in the file of this patent

UNITED STATES PATENTS

| | | |
|---|---|---|
| 2,332,300 | Cook | Oct. 19, 1943 |
| 2,422,698 | Miller | June 24, 1947 |
| 2,442,403 | Flory et al. | June 1, 1948 |